(12) United States Patent
Suzuki et al.

(10) Patent No.: US 12,516,959 B2
(45) Date of Patent: Jan. 6, 2026

(54) STROKE SENSOR AND STROKE SENSOR ASSEMBLY HAVING THE SAME

(71) Applicant: TDK Corporation, Tokyo (JP)

(72) Inventors: Keiji Suzuki, Tokyo (JP); Tatsuya Kato, Tokyo (JP)

(73) Assignee: TDK Corporation, Tokyo (JP)

( * ) Notice: Subject to any disclaimer, the term of this patent is extended or adjusted under 35 U.S.C. 154(b) by 151 days.

(21) Appl. No.: 18/497,448

(22) Filed: Oct. 30, 2023

(65) Prior Publication Data

US 2024/0167851 A1    May 23, 2024

(30) Foreign Application Priority Data

Nov. 21, 2022  (JP) .................................. 2022-185841
Mar. 3, 2023  (JP) .................................. 2023-032431

(51) Int. Cl.
*G01D 5/16* (2006.01)

(52) U.S. Cl.
CPC ........... *G01D 5/16* (2013.01); *G01D 2205/18* (2021.05)

(58) Field of Classification Search
CPC ...... G01D 5/16; G01D 2205/18; G01D 5/145; G01R 33/06
See application file for complete search history.

(56) References Cited

U.S. PATENT DOCUMENTS

| | | | |
|---|---|---|---|
| 12,043,306 B2 * | 7/2024 | Ishikawara | ............. F16D 66/00 |
| 2021/0247172 A1 * | 8/2021 | Moriya | ................. G01B 7/003 |
| 2021/0262829 A1 * | 8/2021 | Moriya | ..................... G01D 5/14 |
| 2021/0293577 A1 * | 9/2021 | Ishikawara | ............ G01D 11/30 |
| 2023/0077951 A1 * | 3/2023 | Moriya | ................. G01D 5/145 |
| | | | 324/207.24 |

FOREIGN PATENT DOCUMENTS

JP            5013146 B2       8/2012

* cited by examiner

*Primary Examiner* — Arleen M Vazquez
(74) *Attorney, Agent, or Firm* — Posz Law Group, PLC (57) ABSTRACT

A stroke sensor for detecting a position of a moving object that linearly moves has: a magnetic field generator; a support member that supports the magnetic field generator; and a magnetic field detecting element that detects a magnetic field that is generated by the magnetic field generator. The support member converts a first relative movement of the moving object relative to the magnetic field detecting element to a second relative movement of the magnetic field generator relative to the magnetic field detecting element. The first relative movement is made along a first linear path, the second relative movement is made along a second linear path, and the second linear path extends at an angle different from the first linear path.

15 Claims, 10 Drawing Sheets

STROKE SENSOR AND STROKE SENSOR ASSEMBLY HAVING THE SAME

FIELD

The present application is based on, and claims priority from, JP2022-185841, filed on Nov. 21, 2022 and JP2023-032431, filed on Mar. 3, 2023, the disclosure of which is hereby incorporated by reference herein in its entirety.

The present disclosure relates to a stroke sensor and a stroke sensor assembly having the same.

BACKGROUND

A stroke sensor that detects the position of a moving object that moves linearly is known. JP5013146 discloses a stroke sensor having a magnetic field detecting element and magnets that are attached with a gap between the moving object and the magnets. As the moving object moves, the magnetic field that is generated by the magnets where the magnetic field detecting element is positioned changes. The magnetic field detecting element detects the positions of the magnets relative to the magnetic field detecting element, that is, the position of the moving object, by detecting the change in the magnetic field.

SUMMARY

A stroke sensor for detecting a position of a moving object that linearly moves of the present disclosure comprises: a magnetic field generator; a support member that supports the magnetic field generator; and a magnetic field detecting element that detects a magnetic field that is generated by the magnetic field generator. The support member converts a first relative movement of the moving object relative to the magnetic field detecting element to a second relative movement of the magnetic field generator relative to the magnetic field detecting element. The first relative movement is made along a first linear path, the second relative movement is made along a second linear path, and the second linear path extends at an angle different from the first linear path.

The above and other objects, features and advantages of the present disclosure will become apparent from the following description with reference to the accompanying drawings that illustrate examples of the present disclosure.

BRIEF DESCRIPTION OF THE DRAWINGS

Accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In the stroke sensor disclosed in JP5013146, the magnets are provided at intervals. Therefore, when the range of movement of the moving object is large, the interval between the magnets increases. As a result, the intensity of the magnetic field that is generated by the magnets becomes insufficient and the performance of detecting the position of the moving object may be impaired. Although it is possible to limit the worsening of the performance of detecting the position of the moving object by increasing the intensity of the magnetic field, an increase in the size of the magnets or the use of magnetic material having high coercive force is required and the cost of the magnets and the stroke sensor may increase.

According to the present disclosure, it is possible to provide a stroke sensor at limited cost that can ensure the performance of detecting the position of a moving object having a large range of movement.

Embodiments of the stroke sensor assembly and the stroke sensor of the present disclosure will be described with reference to the drawings. Stroke sensor assembly 1 and stroke sensor 3 of the present embodiments are not limited in use and may be applied to vehicles such as automobiles and motorcycles and to industrial machines and is particularly applicable to the detection of the position of a moving object having a large range of movement. In the following descriptions and drawings, the X-direction refers to the direction of movement of moving object 2. The Y-direction refers to a direction perpendicular to the surface on which guide path P3 is provided and is perpendicular to the X-direction. The Z-direction refers to the direction perpendicular to the X-direction and the Y-direction. In the following descriptions, the term "relative movement" is used, and the identity of the element that moves is judged according to the context. For example, the sentence "element A moves relative to element B" is interpreted to mean that element B moves when element A is fixed and to mean that element A moves when element B is fixed.

First Embodiment

Figure 1:
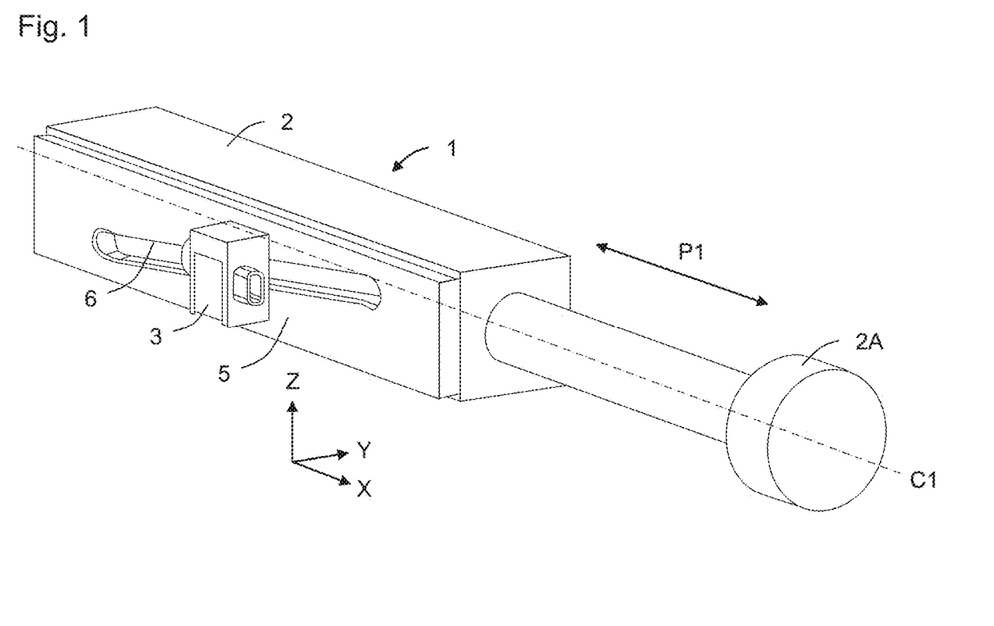
FIG. 1 is a schematic perspective view of a stroke sensor assembly according to a first embodiment of the present disclosure.
Figure 2:
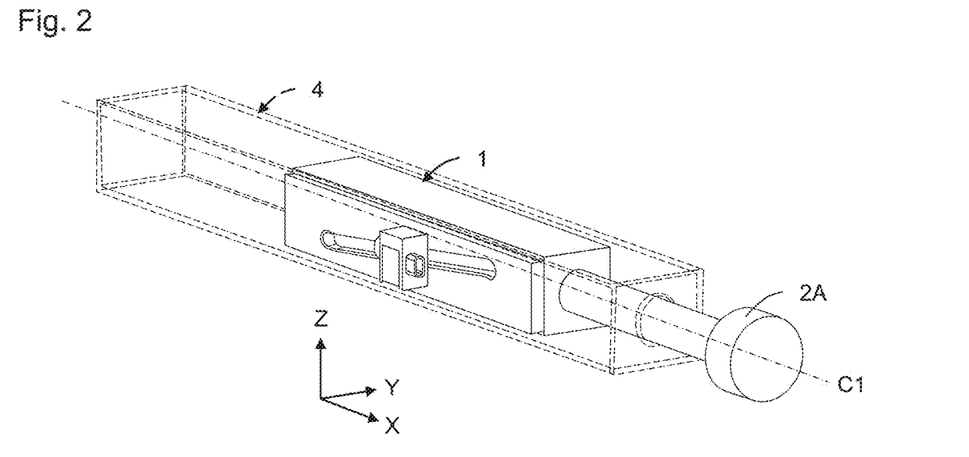
FIG. 2 is a schematic perspective view of the stroke sensor assembly shown in FIG. 1 and a container of the moving object.

FIG. 1 shows a schematic perspective view of stroke sensor assembly 1, and FIG. 2 shows a schematic perspective view of stroke sensor assembly 1 and container 4 of stroke sensor assembly 1. Stroke sensor assembly 1 has moving object 2 that moves linearly and stroke sensor 3 that detects the position of moving object 2. As shown in FIG. 2, moving object 2 is housed in container 4 such as a housing and can slide in container 4 in the X-direction. In other words, moving object 2 has first linear path P1 that is parallel to the X-direction, and moving object 2 moves along first linear path P1 in the X-direction. Container 4 is fixed to the main body (not illustrated) of a vehicle or a machine. First linear path P1 substantially coincides with center line C1 of moving object 2 along the X-direction. One end 2A of moving object 2 is provided outside of container 4 and is connected to a driving means (not illustrated). Most of stroke sensor 3 is provided outside container 4. Guide plate 5 having slot 6 is fixed to the surface of moving object 2 that faces stroke sensor 3, and as described later, stroke sensor 3 is connected to moving object 2 by slot 6.

Figure 3:
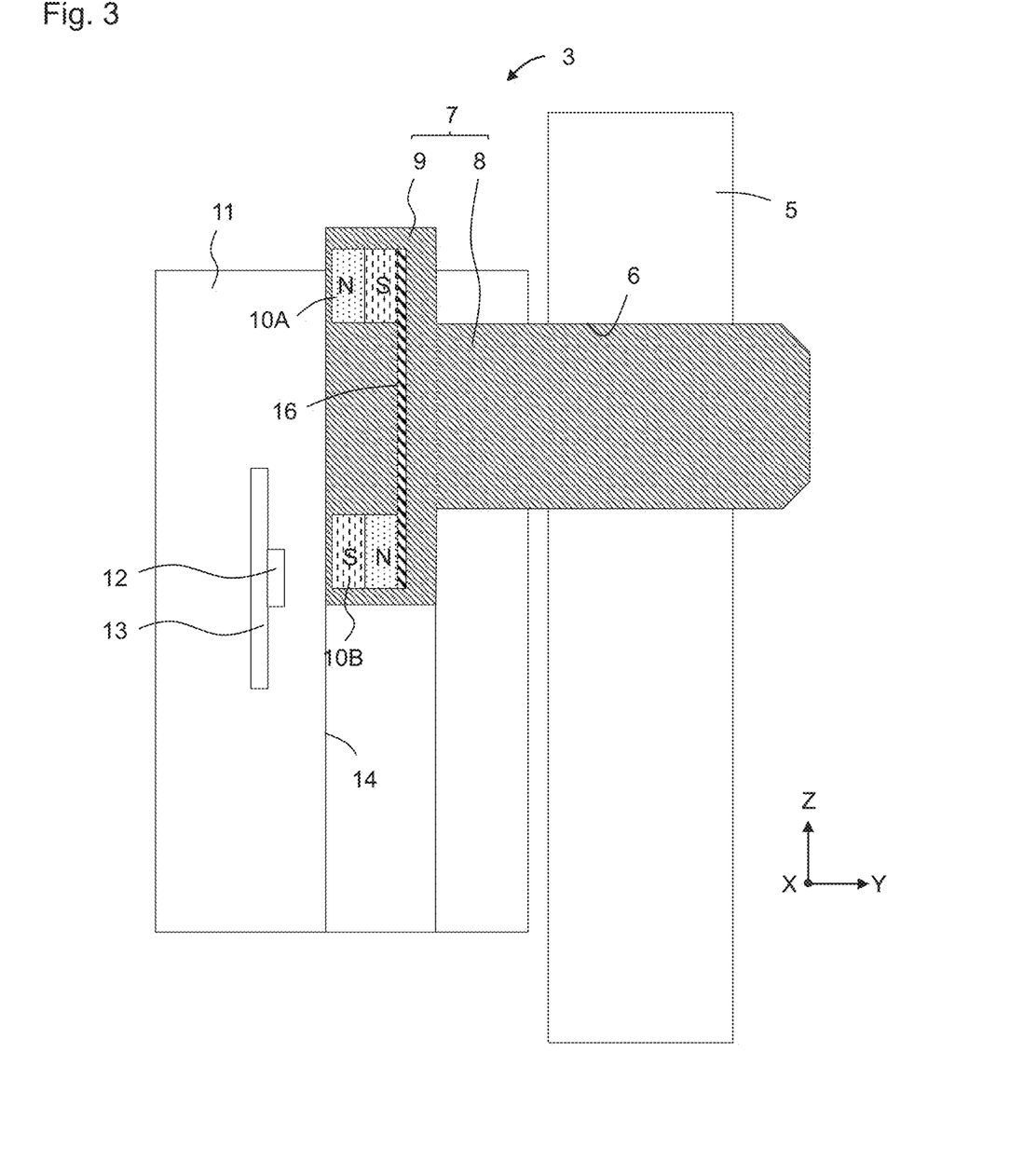
FIG. 3 is a schematic cross-sectional view of a support member and an element mounting portion of the stroke sensor assembly shown in FIG. 1.

FIG. 3 shows a schematic cross-sectional view of stroke sensor 3. Stroke sensor 3 has support member 7 that supports two magnetic field generators 10A and 10B and element mounting portion 11 that is provided with magnetic field detecting element 12. Magnetic field generators 10A and 10B are magnets, and the surfaces that face magnetic field detecting element 12 have different polarities (that is, one is the N pole and the other is the S pole). Magnetic field generators 10A and 10B are connected to yoke 16. Yoke 16 has the function of enhancing the magnetic flux density of magnetic field generators 10A and 10B and thereby limits an increase in the size of magnetic field generators 10A and 10B. The number of magnets is not limited to two, and three or more magnets may be arranged. When three or more magnets are arranged, the three or more magnets are arranged such that the polarities of adjacent magnets are different from each other. Alternatively, only one magnet may be provided. In this case, the magnet may be magnetized in the Y-direction or in the Z-direction.

Support member 7 is formed of resin or nonmagnetic metal and is integrated with magnetic field generators 10A and 10B by suitable means such as engaging, bonding, or insert molding. Alternatively, support member 7 and magnetic field generators 10A and 10B may be integrated using a plastic magnet. Support member 7 is substantially T-shaped. Support member 7 has first guide portion 8 that engages with slot 6 and that is guided by slot 6 and second guide portion 9 that engages with groove 14 of element mounting portion 11. First guide portion 8 is a substantially cylindrical element. Second guide portion 9 has the same section as groove 14 and has an elongated shape in the X-direction (see FIG. 5), but the shape of second guide portion 9 is not limited.

Element mounting portion 11 is formed of resin or non-magnetic metal and is fixed to container 4. Element mounting portion 11 may alternatively be fixed to the main body (not illustrated) of the vehicle or the machine. Element mounting portion 11 is a substantially rectangular parallelepiped. Element mounting portion 11 has groove 14 that guides second guide portion 9. Groove 14 forms second linear path P2 (see FIGS. 6A and 6B) that extends at an angle that is different from the angle of first linear path P1 (see FIGS. 6A and 6B). Groove 14 is provided parallel to two surfaces of element mounting portion 11 that face each other, and an increase in the volume of element mounting portion 11 is therefore constrained. In the present embodiment, first linear path P1 (the path of movement of moving object 2) or an extension of first linear path P1 and second linear path P2 (the path along which groove 14 extends) or an extension of second linear path P2 are perpendicular to each other. That is, groove 14 extends in the Z-direction. Support member 7 can move via groove 14 in the Z-direction relative to element mounting portion 11 or magnetic field detecting element 12.

Magnetic field detecting element 12 detects a magnetic field that is generated by magnetic field generators 10A and 10B. The arrangement of magnetic field detecting element 12 is not particularly limited and may employ a magneto-resistive effect element (for example, an AMR element, a TMR element, or a GMR element) or a Hall element. Magnetic field detecting element 12 is mounted on substrate 13 and receives signals from the outside and sends signals to the outside via substrate 13. Magnetic field detecting element 12 detects magnetic fields in the Y-direction and in the Z-direction that are formed by magnetic field generators 10A and 10B and detects its position relative to magnetic field generators 10A and 10B based on the angle of the combined magnetic field of these magnetic fields.

Figure 4:
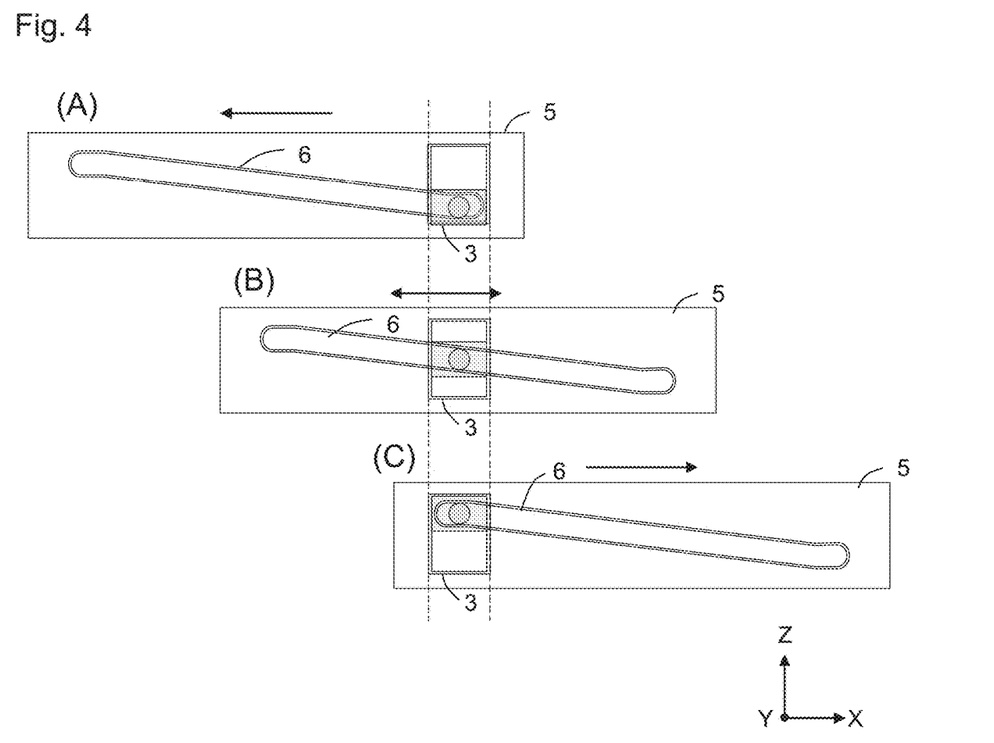
FIGS. 4 and 5 are conceptual views showing the relative movement of the stroke sensor and the moving object of the stroke sensor assembly shown in FIG. 1.
Figure 5:
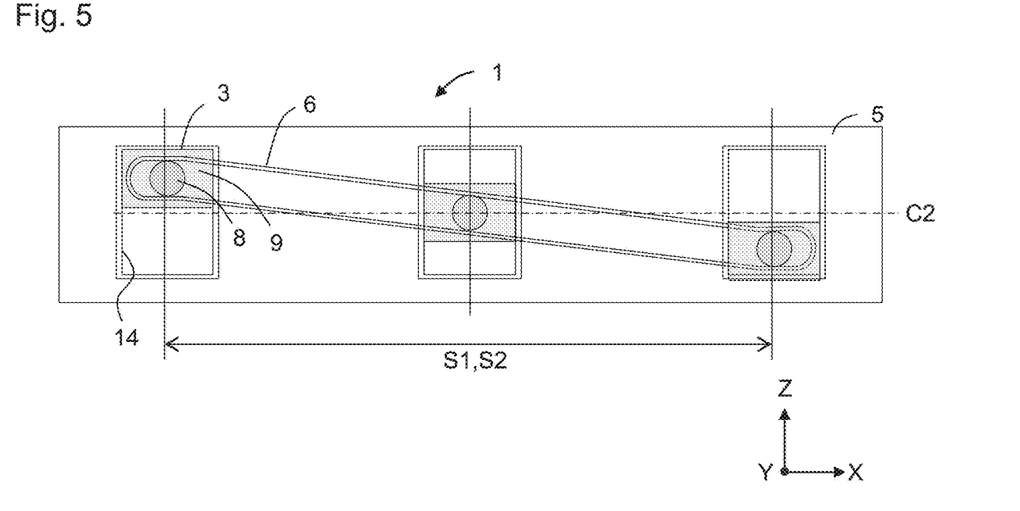
Figure 6A:
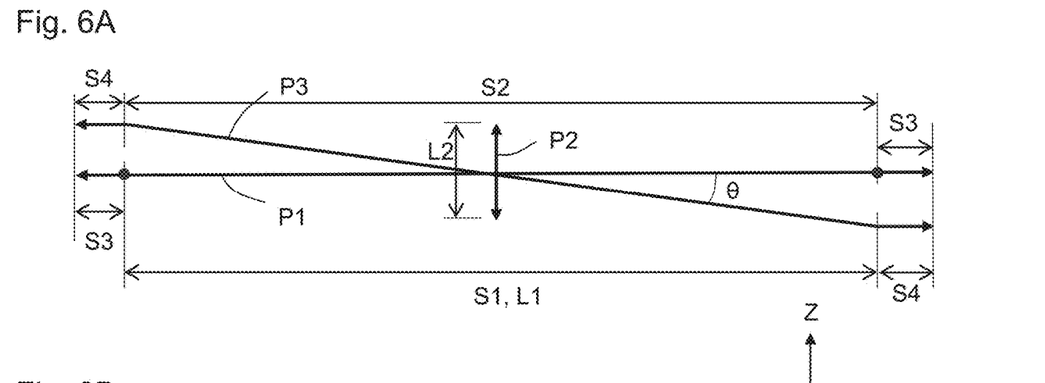
FIGS. 6A and 6B are conceptual views each showing first and second linear paths and a guide path of the stroke sensor assembly shown in FIG. 1.

FIG. 4 shows the manner in which moving object 2 (guide plate 5) moves relative to stroke sensor 3. Stroke sensor 3 is at a fixed position. Referring to part (A) of FIG. 4, stroke sensor 3 is positioned at the right end of correspondence section S2 (see FIGS. 6A and 6B) of slot 6, referring to part (B) of FIG. 4, stroke sensor 3 is positioned at the center of correspondence section S2 of slot 6, and referring to part (C) of FIG. 4, stroke sensor 3 is positioned at the left end of correspondence section S2 of slot 6. FIG. 5 is a view similar to FIG. 4 but for convenience is illustrated such that moving object 2 is fixed and stroke sensor 3 moves. FIG. 6A is a conceptualized view of FIG. 5 in which first and second linear paths P1 and P2 and guide path P3 are shown by their center lines.

As described above, moving object 2 has slot 6. Slot 6 forms guide path P3 that guides support member 7, and support member 7 moves along slot 6 relative to moving object 2. Normally, moving object 2 moves in the X-direction in a specific range (hereinafter, referred to as normal movement section S1). Accordingly, first guide portion 8 of support member 7 engages with slot 6 in a section that corresponds to normal movement section S1 (hereinafter, referred to as correspondence section S2). As described later, slot 6 has additional sections S4 outside of correspondence section S2, but normally first guide portion 8 does not enter additional sections S4. In correspondence section S2, guide path P3 linearly extends in the X-Z plane in a direction that is slightly tilted from the X-axis. Guide path P3 is not limited to a linear line and may be, for example, sinusoidal, but may be linear from the viewpoint of the processing cost of slot 6. The length of normal movement section S1 of moving object 2 depends on the application of stroke sensor assembly 1 but is in the range of tens of millimeters for a short section length and is in the range of hundreds of millimeters for a long section length. The width of slot 6 is constant for the entire length and is set to be slightly larger than the diameter of first guide portion 8.

Stroke sensor 3 operates as follows. First, moving object 2 moves in the X-direction. Since element mounting portion 11 of stroke sensor 3 is fixed, the movement of moving object 2 in the X-direction is equivalent to the movement in the X-direction relative to element mounting portion 11 or magnetic field detecting element 12. This relative movement is referred to as a first relative movement. The first relative movement of moving object 2 is made along first linear path P1 that is parallel to the X-axis.

Support member 7 or magnetic field generators 10A and 10B of stroke sensor 3 moves along slot 6 relative to moving object 2. Thus, support member 7 of stroke sensor 3 moves relative to moving object 2 in two directions, that is, in the X- and Z-directions. However, support member 7 or magnetic field generators 10A and 10B is restricted in the X-direction by groove 14 of element mounting portion 11 and moves only in the Z-direction relative to element mounting portion 11 or magnetic field detecting element 12. This relative movement is referred to as a second relative movement. The second relative movement is made along second linear path P2. In this manner, support member 7 converts the first relative movement of moving object 2 relative to magnetic field detecting element 12 to the second relative movement of magnetic field generators 10A and 10B relative to magnetic field detecting element 12.

Second linear path P2 is shorter than first linear path P1. The relationship of L1>L2 is satisfied, where L1 is the length of normal movement section S1 of moving object 2 along first linear path P1, and L2 is the length of second linear path P2 that corresponds to L1, that is, the length of the range of movement of support member 7 along second linear path P2 during the normal movement of moving object 2. The ratio L2/L1 is equal to tan θ, where θ is the angle that is formed by first linear path P1 and correspondence section S2 of guide path P3.

If magnetic field detecting element 12 and magnetic field generators 10A and 10B are provided along first linear path P1, then the intensity of the magnetic field of magnetic field generators 10A and 10B has to be increased in order to obtain the necessary intensity of the magnetic field over the entire length of normal movement section S1 along first linear path P1. However, this leads to an increase in the size of magnetic field generators 10A and 10B and an increase in the cost of stroke sensor 3. In the present embodiment, first linear path P1 is converted to second linear path P2 to shorten the range of movement of magnetic field generators 10A and 10B, thereby enabling a limitation of both increase in the size of magnetic field generators 10A and 10B and increase in cost of stroke sensor 3. On the other hand, if length L2 is too short, then the resolution of stroke sensor 3 is impaired. Length L2 is may be set to an appropriate range. The ratio L2/L1 may be adjusted by angle θ.

Guide path P3 has at least one additional section S4 that is connected to correspondence section S2 of moving object 2 outside correspondence section S2. In the present embodiment, additional sections S4 are provided on both sides of correspondence section S2. The two additional sections S4 have the same length but may alternatively have different lengths. Sections S3 that correspond to additional sections S4 are also provided on both sides of normal movement section S1 of first linear path P1. The section consisting of normal movement section S1 and two sections S3 corresponds to the range in which moving object 2 can physically move.

First guide portion 8 of support member 7 normally does not enter additional sections S4 because additional sections S4 are positioned outside of correspondence section S2. However, if there are no additional sections S4, first guide portion 8 and slot 6 may suffer damage if for any reason first guide portion 8 should move beyond correspondence section S2. In addition, first guide portion 8 may be moved beyond correspondence section S2 for inspection or adjustment in the manufacturing process of stroke sensor 3. In these cases, additional sections S4 can accommodate first guide portion 8. When first guide portion 8 is likely to move only to one side beyond correspondence section S2 during operation or in the manufacturing process, only one additional section S4 may be provided on one side of correspondence section S2.

Figure 7:
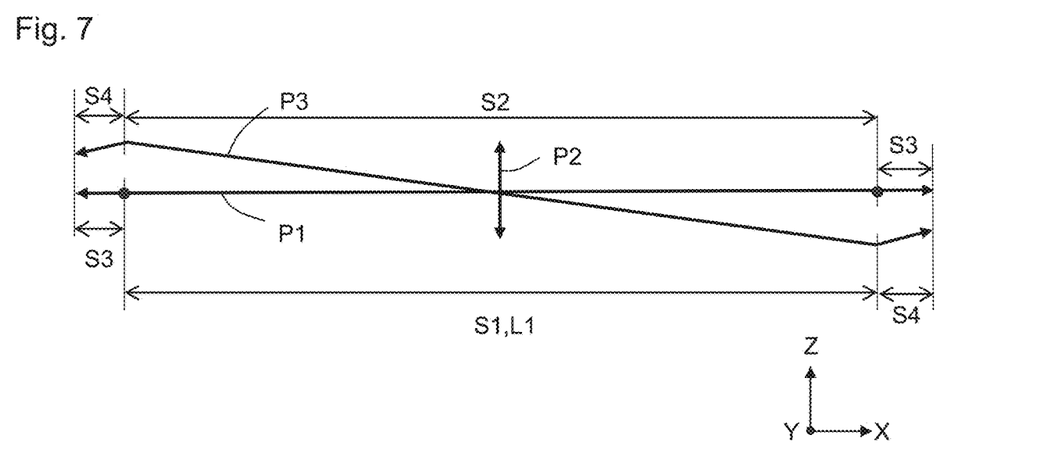
FIG. 7 is a conceptual view showing first and second linear paths and a guide path of a stroke sensor assembly of a comparative example.

Additional sections S4 start at the ends of correspondence section S2 and extend in a direction parallel to first linear path P1. FIG. 7 shows additional sections S4 of a comparative example. Additional sections S4 start from the ends of correspondence section S2 and extend in a direction toward reference linear line C2, where reference linear line C2 is a linear line that is parallel to first linear path P1 and that passes through the center of gravity or the center of correspondence section S2 (see FIG. 5. C2 coincides with P1 in FIG. 7). Moving object 2 may stop at any position in normal movement section S1, but if moving object 2 moves thereafter, then the magnetic field that is applied to magnetic field detecting element 12 changes and the direction of movement of moving object 2 can be determined. However, if moving object 2 should move after having stopped at one end of normal movement section S1, support member 7 will move in the same direction (in a direction toward reference linear line C2) regardless of which direction moving object 2 moves. As a result, magnetic field generators 10A and 10B also move in the same direction and magnetic field detecting element 12 will not be able to detect the direction of movement of moving object 2.

In the present embodiment, when moving object 2 moves from one end of normal movement section S1 to a point within normal movement section S1, magnetic field generators 10A and 10B move relative to magnetic field detecting element 12. Accordingly, the magnetic field that is detected by magnetic field detecting element 12 changes. On the other hand, when moving object 2 moves from one end of normal movement section S1 to beyond normal movement section S1, support member 7 moves in parallel along guide path P3 in the X-direction. Magnetic field generators 10A and 10B do not move relative to magnetic field detecting element 12, and the magnetic field that is detected by magnetic field detecting element 12 is constant. Based on these differences, the direction of movement of moving object 2 can be detected.

Figure 6B:
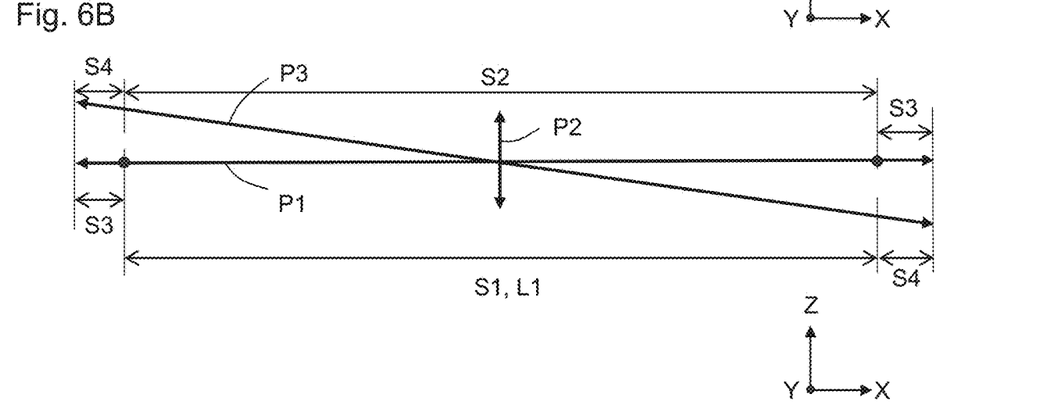

As will be understood from the foregoing, it is sufficient that additional sections S4 not extend in a direction toward reference linear line C2 from the ends of correspondence section S2. Thus, additional sections S4 may also extend in a direction away from reference linear line C2. For example, as shown in FIG. 6B, additional sections S4 may coincide with extensions of correspondence section S2. In this case, slot 6 is formed in a linear shape between both ends and the processing of slot 6 is facilitated. In addition, since the magnetic field that is detected by magnetic field detecting element 12 when moving object 2 moves from one end of normal movement section S1 to a point within normal movement section S1 is different from the magnetic field detected when moving object 2 moves beyond normal movement section S1, the direction of movement of moving object 2 can be detected in the present modification.

The width of slot 6 is may be constant along the entire length thereof. In other words, the width of additional sections S4 may be substantially equal to the width of correspondence section S2. If its width of additional sections S4 is larger than its width of correspondence section S2, then the position of first guide portion 8 in the Z-direction becomes unstable in additional sections S4, and the same problem as mentioned previously may arise.

Figure 8:
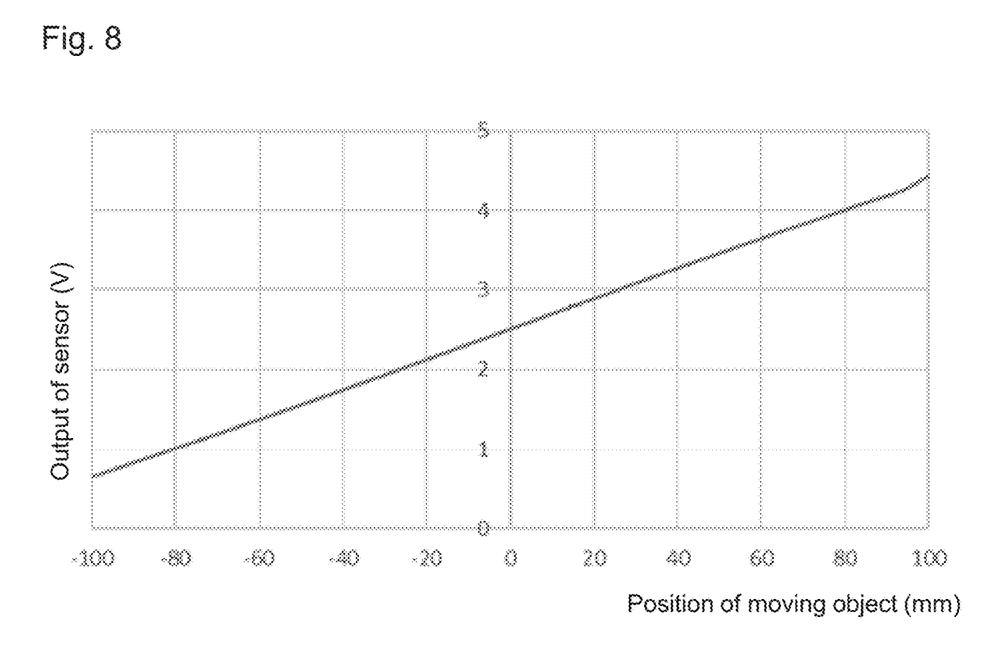
FIG. 8 is an exemplary graph showing the relationship between the position of the moving object and the output of the sensor of the stroke sensor assembly shown in FIG. 1.

FIG. 8 shows the position detection performance of stroke sensor 3 in the present embodiment, i.e., FIG. 8 shows examples of the calculation results of the relationship between the position of moving object 2 and the output of the sensor. The relationship between the position of moving object 2 and the output of the sensor was substantially linear, and good performance was obtained. It should be noted that the linearity can be improved by calibrating the output of the sensor, and as a result, slightly poor linearity of the output of the sensor is not a large problem.

Modifications

Figure 9:
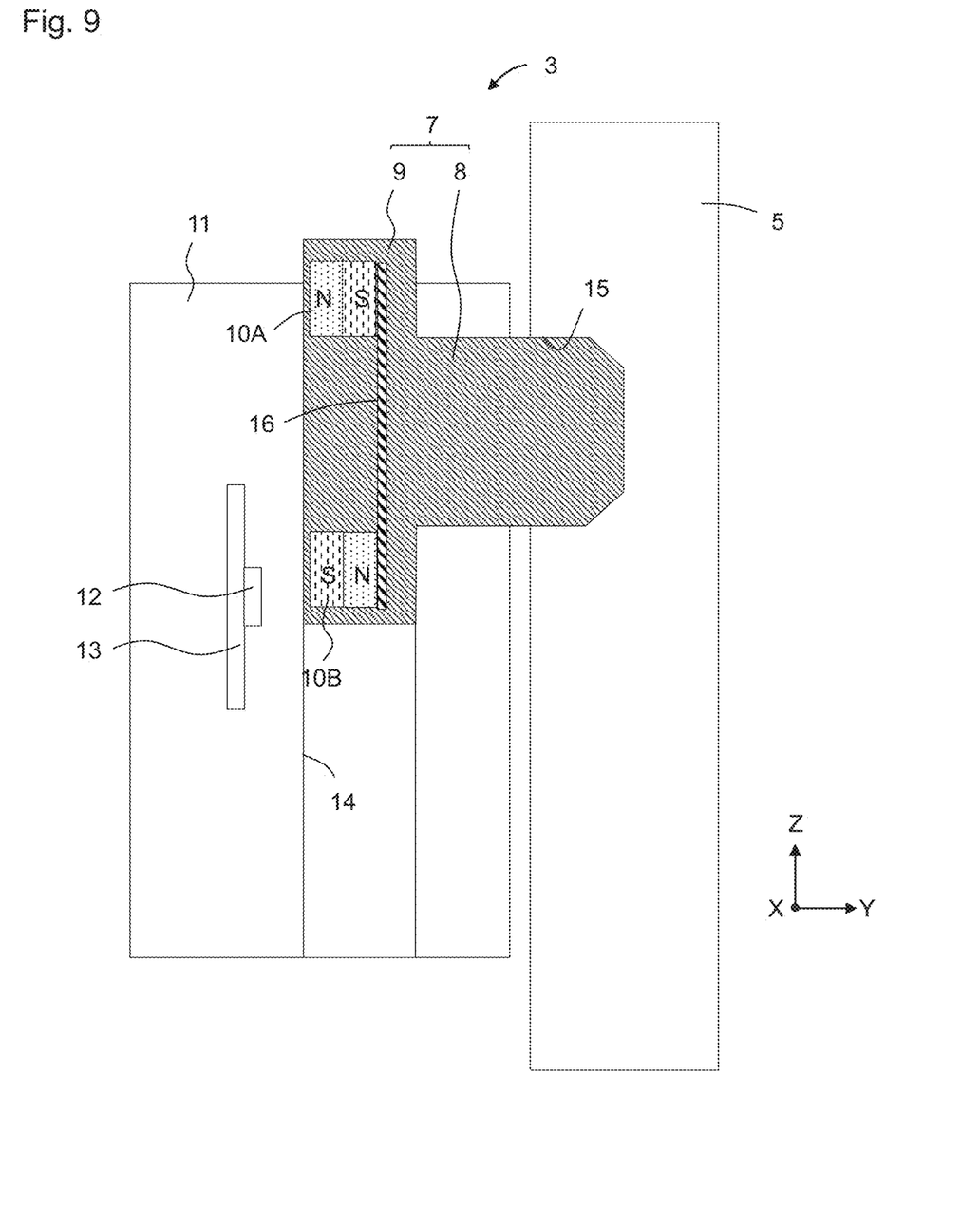
FIG. 9 is a schematic cross-sectional view of the support member and the element mounting portion of a stroke sensor assembly according to a modification of the present disclosure.

Embodiments of the present disclosure have been described, but the present disclosure is not limited to these embodiments. For example, guide path P3 is not limited to slot 6. FIG. 9 shows a modification of the present embodiment in which guide path P3 is groove 15. That is, guide path P3 terminates halfway through guide plate 5 in the direction of thickness thereof. Although not illustrated, guide path P3 may alternatively be an elongated protrusion such as a rail. Alternatively, more than one guide path P3 may be provided.

Figure 10:
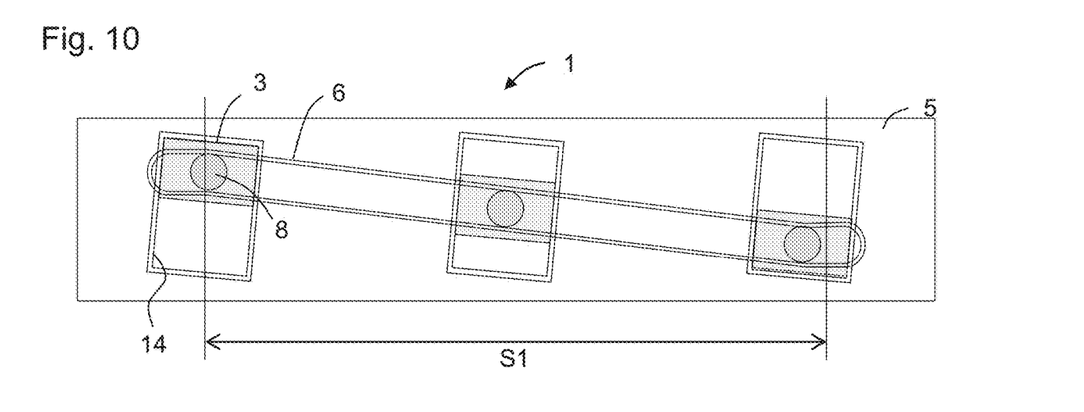
FIG. 10 is a conceptual view showing the relative movement of the stroke sensor and the moving object according to a stroke sensor assembly of another modification of the present disclosure.
Figure 11:
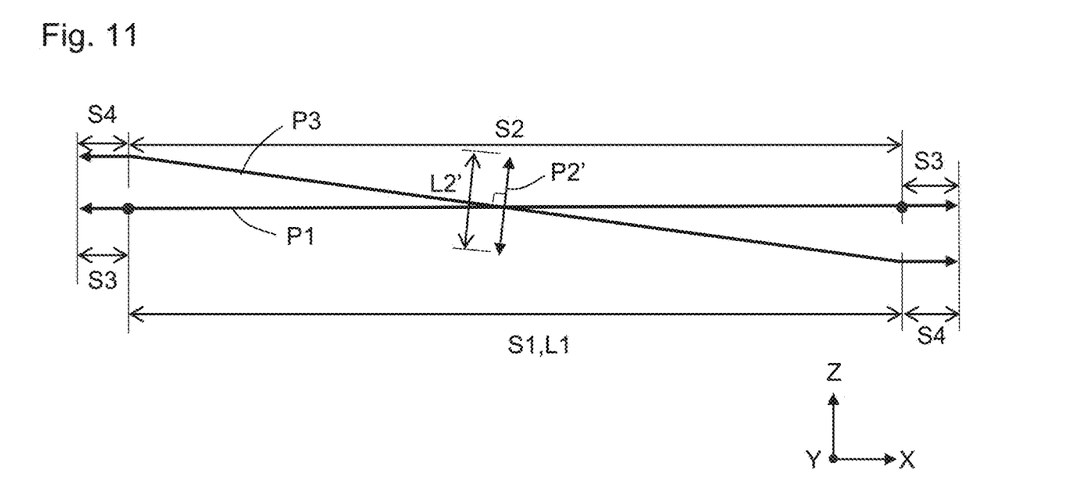
FIG. 11 is a conceptual view showing first and second linear paths and a guide path of the stroke sensor assembly shown in FIG. 10.

FIGS. 10 and 11 show another arrangement of guide path P3. FIG. 10 corresponds to FIG. 5, and FIG. 11 corresponds to FIG. 6A. Correspondence section S2 of guide path P3 or extensions of correspondence section S2 are perpendicular to second linear path P2' or extensions of second linear path P2'. As a result, the length of second linear path P2' can be formed longer than in the first embodiment. Specifically, the relationship L2'>L2 is satisfied where L2' is the length of second linear path P2' that corresponds to L1, that is, the length of the range of movement of support member 7 along second linear path P2' during the normal movement of moving object 2. The resolution of stroke sensor 3 can be enhanced as compared to the first embodiment.

Additional Modifications

Figure 12:
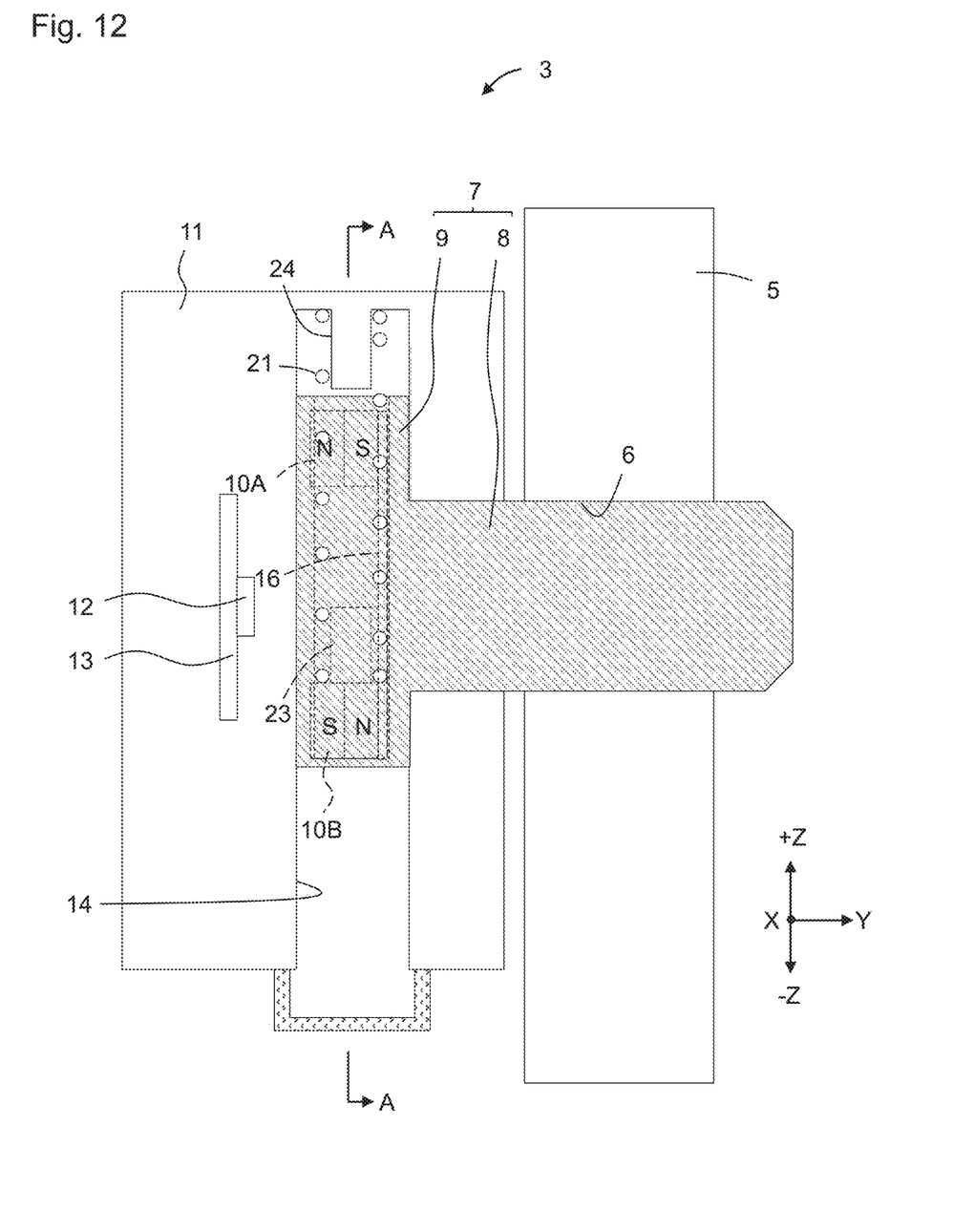
FIG. 12 is a schematic cross-sectional view of the support member and the element mounting portion of a stroke sensor assembly according to another modification of the present disclosure.
Figure 13:
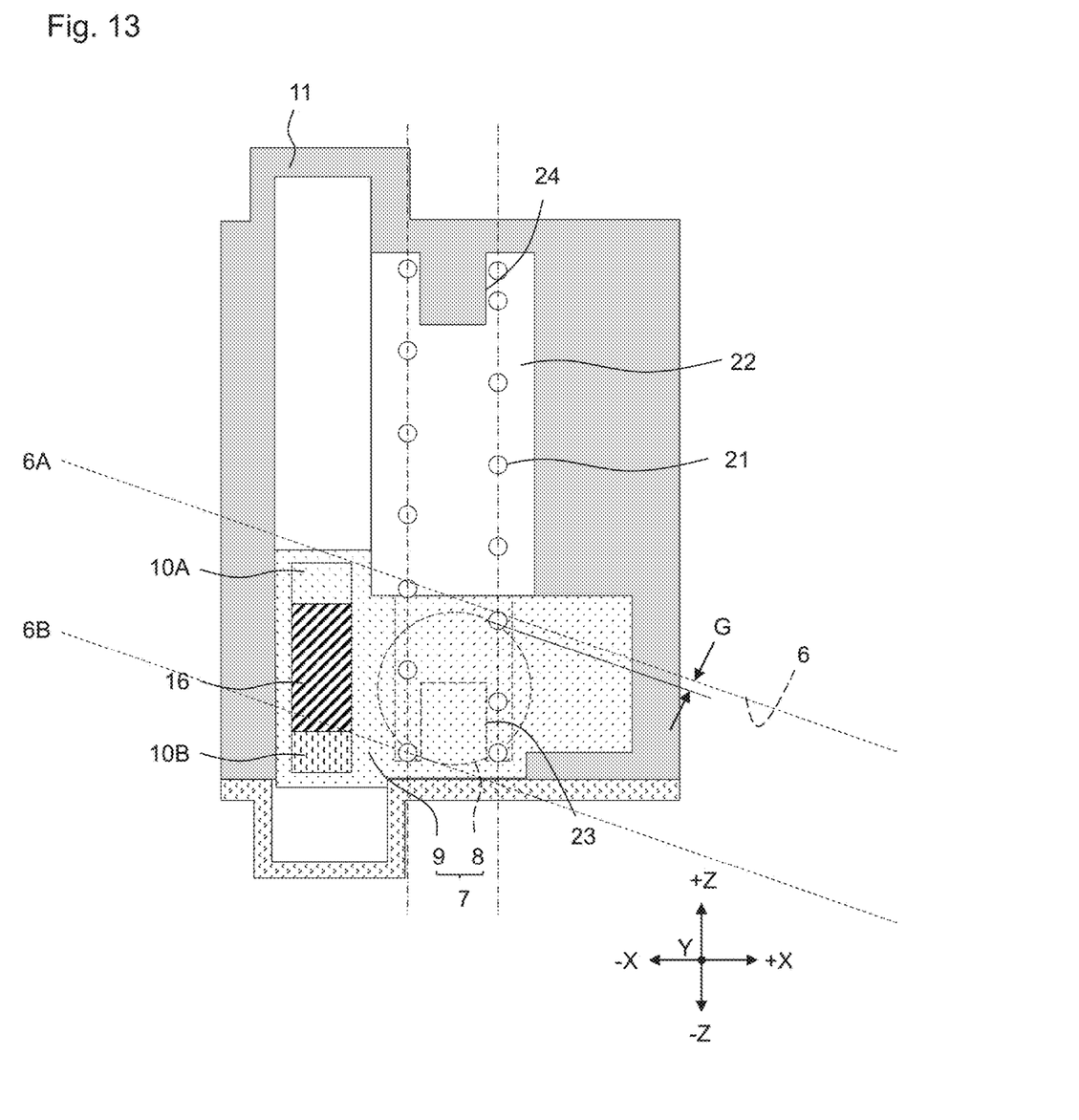
FIG. 13 is a schematic cross-sectional view of the support member and the element mounting portion of the stroke sensor assembly shown in FIG. 12.
Figure 14A:
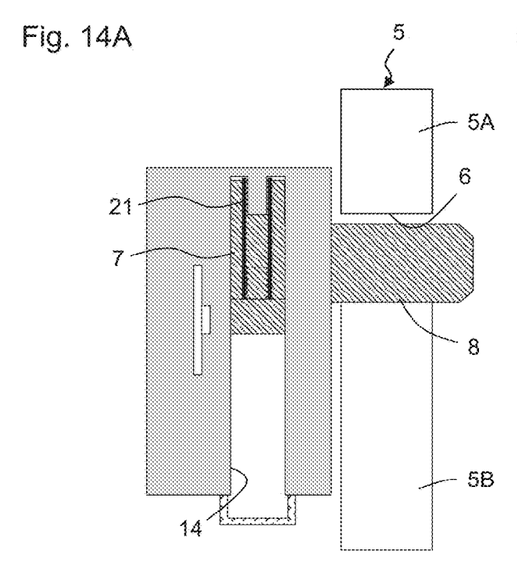
FIGS. 14A to 14C are conceptual views showing the relative movement of the support member of the stroke sensor assembly shown in FIG. 12.
Figure 14B:
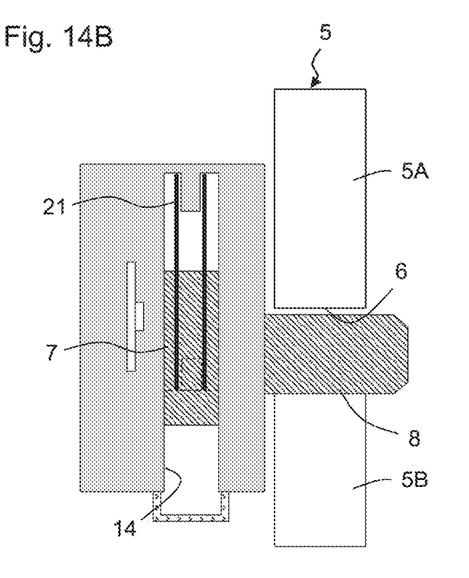
Figure 14C:
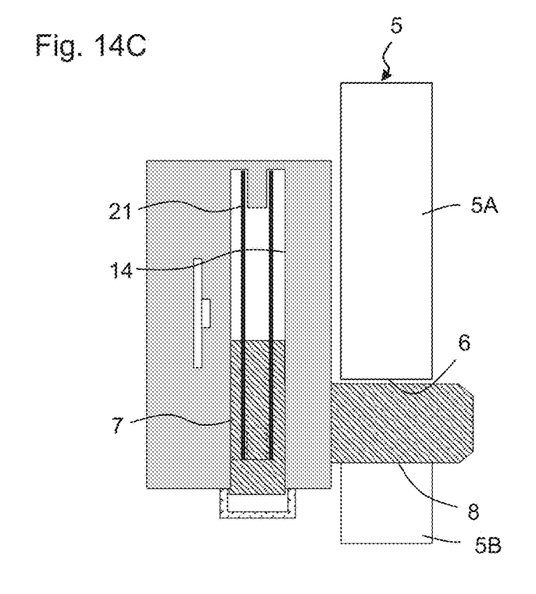

FIGS. 12 to 14 show another modification of the present embodiment. FIG. 12 is a view that corresponds to FIG. 3 and schematically shows the cross section of stroke sensor 3 as seen in the X-direction. FIG. 13 is a cross-sectional view taken along line A-A in FIG. 12 and schematically shows a cross section of stroke sensor 3 as seen in the Y-direction. FIG. 13 also shows slot 6. Referring to FIG. 13, second guide portion 9 has housing portion 22 for elastic element 21 on the side of the supporting portion for magnetic field generators 10A and 10B in the Y-direction. Housing portion 22 has first annular groove 23. Element mounting portion 11 has second annular groove 24 that faces first annular groove 23. First annular groove 23 and second annular groove 24 support the two ends of elastic element 21 that is formed of a coil spring. Elastic element 21 is supported by second annular groove 24 that is a fixed part and applies an elastic force to the bottom of first annular groove 23 that is a movable part. As a result, support member 7 is always subject to a force in the −Z-direction. In other words, elastic element 21 biases first guide portion 8 against slot 6 in the −Z-direction.

FIG. 13 shows the positional relationship between first guide portion 8 and slot 6. Although shown in exaggerated form in the figure, gap G is provided between first guide portion 8 and slot 6. Since first guide portion 8 engages with slot 6, it is difficult to eliminate gap G due to error in manufacturing. First guide portion 8 moves relative to slot 6 in both directions (the +Z-direction and the −Z-direction). Assuming that there is no biasing force of elastic element 21, when slot 6 moves in the +X-direction, first guide portion 8 moves in the +Z-direction while remaining in contact with one surface 6B of slot 6. When slot 6 moves in the −X-direction, first guide portion 8 moves in the −Z-direction while remaining in contact with the other surface 6A of slot 6. As a result, when first guide portion 8 is at a specific position in the X-direction relative to slot 6, the position of first guide portion 8 in the Z-direction relative to slot 6 shifts by the size of gap G depending on the direction of movement. The position of first guide portion 8 in the X-direction and the position of first guide portion 8 in the Z-direction do not have a one-to-one correspondence and hysteresis occurs. The hysteresis may cause a measurement error of stroke sensor 3. In addition, when vibration or impact occurs in, for example, a vehicle in which stroke sensor 3 is installed, first guide portion 8 will collide against slot 6 and receive vibration or impact that may cause failure of stroke sensor 3.

FIGS. 14A to 14C show the relative movement of support member 7 of stroke sensor assembly 1. Support member 7 is at one end of groove 14 in FIG. 14A, in the middle of groove 14 in FIG. 14B, and at the other end of groove 14 in FIG. 14C. Elastic element 21 is compressed over the entire range of movement of support member 7 in the Z-direction (producing a biasing force in the −Z-direction). Elastic element 21 biases first guide portion 8 against slot 6 in the −Z-direction regardless of which position in groove 14 support member 7 is positioned. Thus, first guide portion 8 maintains contact with the same surface of slot 6 irrespective of the direction of movement of first guide portion 8. Accordingly, the above-mentioned hysteresis is limited.

In the present modification, since first guide portion 8 is only in contact with surface 6B of slot 6 (see FIG. 13), surface 6A of slot 6 may be omitted. For example, half 5A of guide plate 5 may be omitted and only half 5B may be provided in FIGS. 14A to 14C. In this case, guide plate 5 does not have to be a rectangle as shown in FIG. 1, but may be, for example, a triangle that is obtained by cutting the rectangle along a diagonal line, and the amount of material can be reduced. In the present modification, although guide path P3 may also be slot 6 or groove 15, guide path P3 need only have at least one planar portion with which first guide portion 8 is in contact (tilted surface 6B in the present modification).

The center line of first annular groove 23 and the center line of second annular groove 24 may be lie on one single linear line that extends in the Z-direction. In other words, the elastic deformation axis of elastic element 21, that is, the center axis of the coil spring is may be parallel to second linear path P2 (the Z-direction). The friction force can thus be reduced when first guide portion 8 slides along slot 6. The guide path shown in this modification is slot 6, but a similar arrangement may be made when the guide path is a groove.

Although certain preferred embodiments of the present disclosure have been shown and described in detail, it should be understood that various changes and modifications may be made without departing from the spirit or scope of the appended claims.

The invention claimed is:

1. A stroke sensor for detecting a position of a moving object that linearly moves, comprising:
a magnetic field generator;
a support member that supports the magnetic field generator;

a magnetic field detecting element that detects a magnetic field that is generated by the magnetic field generator; and an element mounting portion that is provided with the magnetic field detecting element, wherein the support member converts a first relative movement of the moving object relative to the magnetic field detecting element to a second relative movement of the magnetic field generator relative to the magnetic field detecting element, the first relative movement is made along a first linear path, the second relative movement is made along a second linear path, and the second linear path extends at an angle different from the first linear path, and the element mounting portion includes the second linear path, and the support member moves along the second linear path relative to the magnetic field detecting element.

2. The stroke sensor according to claim 1, wherein the second linear path is shorter than the first linear path.

3. The stroke sensor according to claim 1, wherein the moving object has a guide path that guides the support member, and the support member moves along the guide path relative to the moving object.

4. The stroke sensor according to claim 3, wherein the guide path is a slot or a groove, and the support member has a first guide portion that engages with the slot or the groove.

5. The stroke sensor according to claim 4, wherein the guide path has a planar portion, and the support member has an elastic element that biases the first guide portion against the planar portion.

6. The stroke sensor according to claim 5, wherein an elastic deformation axis of the elastic element is parallel to the second linear path.

7. The stroke sensor according to claim 1, wherein the second linear path is a groove, and the support member has a second guide portion that engages with the groove.

8. The stroke sensor according to claim 3, wherein a correspondence section of the guide path that corresponds to a normal movement section of the moving object is linear.

9. The stroke sensor according to claim 8, wherein the guide path has at least one additional section that is connected to the correspondence section outside the correspondence section, and the at least one additional section starts at an end the correspondence section and extends in a direction parallel to the first linear path.

10. The stroke sensor according to claim 8, wherein the guide path has at least one additional section that is connected to the correspondence section outside the correspondence section, and the at least one additional section starts at an end of the correspondence section and extends in a direction away from a linear line, wherein the linear line is parallel to the first linear path and passes through a center of the correspondence section.

11. The stroke sensor according to claim 10, wherein the at least one additional section coincides with an extension of the correspondence section.

12. The stroke sensor according to claim 9, wherein a width of the at least one additional section is substantially equal to a width of the correspondence section.

13. The stroke sensor according to claim 1, wherein the first linear path or an extension of the first linear path is perpendicular to the second linear path or an extension of the second linear path.

14. The stroke sensor according to claim 8, wherein the correspondence section of the guide path or an extension of the correspondence section is perpendicular to the second linear path or an extension of the second linear path.

15. A stroke sensor assembly comprising:

the stroke sensor according to claim 1; and a moving object.

* * * * *